United States Patent [19]
Keylwert

[11] 3,973,525
[45] Aug. 10, 1976

[54] ROTARY PISTON INTERNAL COMBUSTION ENGINE

[75] Inventor: Johann Keylwert, Bensberg, Germany

[73] Assignee: Klöckner-Humboldt-Deutz Aktiengesellschaft, Cologne, Germany

[22] Filed: Apr. 11, 1975

[21] Appl. No.: 567,190

[30] Foreign Application Priority Data

Apr. 13, 1974 Germany............................ 2418201

[52] U.S. Cl................................ 123/8.05; 123/8.09; 123/8.13
[51] Int. Cl.².......................................... F02B 53/08
[58] Field of Search................. 123/8.05, 8.09, 8.13, 123/3, 54 EC, 75 E

[56] References Cited
UNITED STATES PATENTS

| | | | |
|---|---|---|---|
| 3,452,723 | 7/1969 | Keylwert............................ | 418/186 |
| 3,789,807 | 2/1974 | Pinkerton........................ | 123/59 EC |
| 3,867,911 | 2/1975 | Keylwert............................ | 60/39.63 |
| 3,871,838 | 3/1975 | Henkel et al. ........................ | 123/3 |

FOREIGN PATENTS OR APPLICATIONS

| | | | |
|---|---|---|---|
| 531,430 | 1/1941 | United Kingdom..................... | 123/3 |

*Primary Examiner*—Clarence R. Gordon
*Attorney, Agent, or Firm*—Walter Becker

[57] ABSTRACT

A rotary piston internal combustion engine with a fission vaporizer, gasifier or carburetor means with sealing strips arranged on a mantle section of the housing, and with piston means of trochoidal construction in which the circumference of the piston means is depending on the number of cycles of the employed working method divided by a plurality of axis-near zones or lobes into arches. The piston means form within the region of each arch which during the compression and expansion cycle forms a portion of the confinement of the pertaining working chamber comprises a change-over conduit which is controlled by means of a control opening in an end face of the piston means. This change-over conduit covers the mouth of conduit systems in the housing in such a way that the working chamber during the first and second portion of the compression cycle is temporarily through the change-over passage connected to a fission carburetor so that during the first phase fission gas is withdrawn from the fission vaporizer gasifier or carburetor means, and during the second phase a fission gas-air mixture is conveyed to the vaporizer, gasifier or carburetor means.

3 Claims, 3 Drawing Figures

ROTARY PISTON INTERNAL COMBUSTION ENGINE

The present invention relates to a working chamber forming rotary piston internal combustion engine with fission varporizer, gasifier or carburetor means (Spaltvergaser). Rotary piston internal combustion engines of this type have become known. With this type of engines, liquid fuel is in the fission vaporizer, gasifier or carburetor means converted into a fission gas by the application of a catalyst and the addition of primary air or waste gas at an increased temperature and at an extremely high fuel-air ratio by partial combustion, and the said fission gas is after addition of secondary air burned in the internal combustion engine. Due to this step, the combustion and the waste gas quality of the internal combustion engine is considerably improved. For purposes of mixing the fission gas with the residual combustion air, one or more mixing members are necessary the function of which in practice causes difficulties with regard to the possibility of always for all loads and conditions of operation securing an exactly defined mixing ratio which will also be the same for all cylinders from working cycle to working cycle.

With the heretofore known above mentioned internal combustion engine, the primary air is branched off from the intake conduit of the internal combustion engine and is conveyed to the fission vaporizer, gasifier or carburetor means. In view of the great specific volume of the non-compressed combustion air, the fission carburetor has to be designed relatively large.

It is an object of the present invention with simple means to improve the structural volume of the fission carburetor and its manner of operation. This object and other objects and advantages of the invention will appear more clearly from the following specification in connection with the accompanying drawings, in which.

Figure 1:
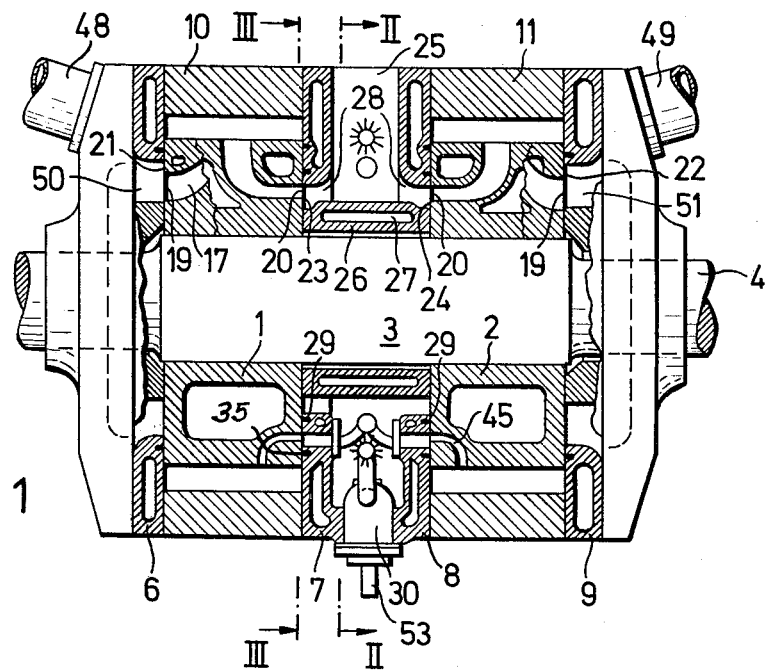
FIG. 1 represents a diagrammatic longitudinal section through a rotary piston internal combustion engine according to the invention in which two pistons are journalled on a common eccentric.
Figure 2:
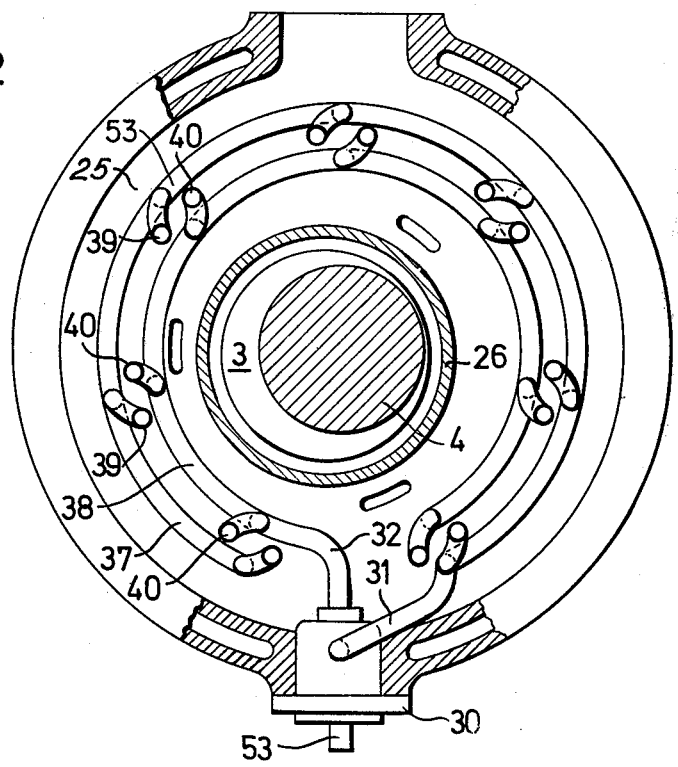
FIG. 2 illustrates on a somewhat larger scale than FIG. 1 a section taken along the line II—II of FIG. 1.
Figure 3:
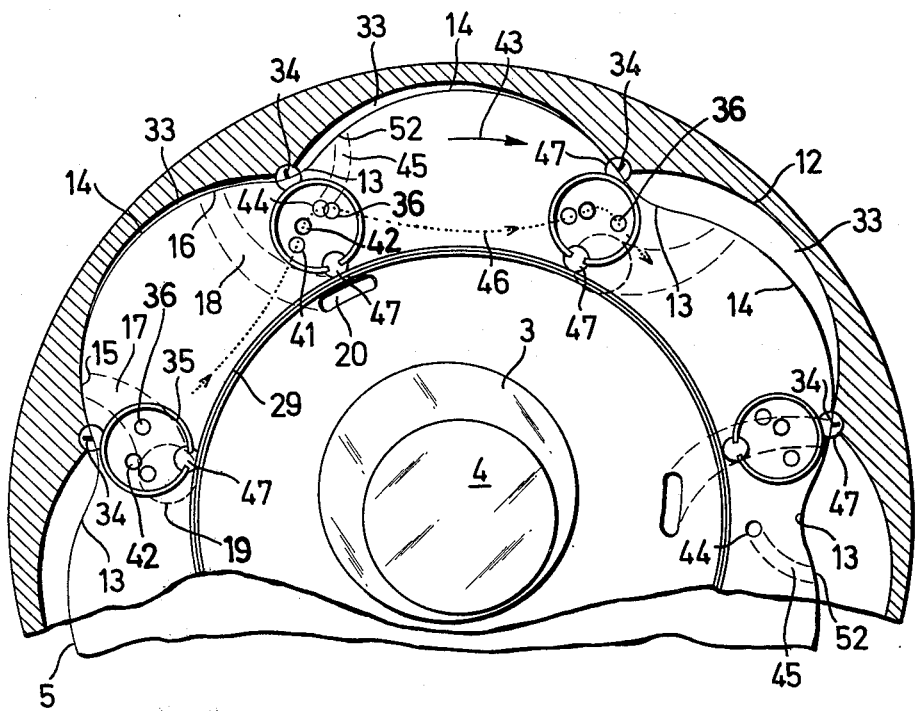

FIG. 3 likewise illustrates on a scale larger than that of FIG. 1 a section taken along the line III—III of FIG. 1 while the contour of the piston is indicated by thin lines, and the projections of the inlet, outlet and change-over passages are shown in thin lines.

The rotary piston internal combustion engine with fission carburetor according to the invention is characterized primarily in that with an inner and parallel axial rotary piston internal combustion engine with meshing engagement, with sealing strips provided on the mantle and with a piston of the trochoidal design the circumference of which is, depending on the number of cycles of the employed working method divided by a plurality of axis-near zones or lobes into arches and which piston is within the region of each arch which later during the compression and expansion cycles forms the confinement of a working chamber, comprises a change-over passage or conduit. This passage or conduit is controlled by a control opening provided in an end face of the piston and so overlaps openings of conduit systems in the housing that the working chamber during the first and second portion of the compression cycle is temporarily through the change-over passage or conduit connected with a fission carburetor in such a way that during the first phase fission gas is withdrawn from the fission carburetor whereas during the second phase a fission gas-air mixture is introduced.

Due to the design according to the invention, a portion of the already compressed compression air is conveyed to the fission carburetor. Inasmuch as the combustion air in compressed condition has a smaller specific volume, the fission carburetor can be held small as to its dimensions. The fission and gasification process in the fission carburetor is added by the increased temperature of the compressed air. Furthermore, due to the return of the fission gas of increased pressure into the working chamber during the first portion of the compression cycle at a lower pressure in the working chamber, a very satisfactory intermixing of the fission gas with the drawn-in fresh combustion air takes place so that no additional mixing devices are required.

According to a further development of the invention, it is suggested that a further change-over passage or conduit and an additional control opening be provided which establish communication between the working chamber and the fission carburetor during the expansion cycle. As a result thereof, the return of the portion of the exhaust gas into the fission carburetor is made possible which portion of the exhaust gas due to its heat content and its content in unburned ingredients favorably acts upon the formation of the fission gas (spaltgas).

According to a further development of the invention, two identical pistons are provided which are journalled on a common eccentric shaft, and the fission carburetor is arranged in a housing section between the pistons. In this way, connecting lines keep the heat and pressure losses at a minimum.

Referring now to the drawings in detail, the internal combustion engine illustrated therein represents an inner and parallel axial rotary piston internal combustion engine with meshing engagement. The engine has two pistons 1 and 2 which are journalled on a common eccentric 3 of an eccentric shaft 4 and the cross sectional contour 5 of which (FIG. 3) is determined by a six-arch epitrochoid.

The eccentric shaft 4 is journalled in a housing which primarily consists of lateral parts 6,7,8,9 and of mantles 10 and 11 arranged therebetween. The inner cross sectional confinement 12 (FIG. 3) of the mantles 10 and 11 is determined by the outer enveloping curve of the cross sectional contour 5 of pistons 1 and 2. Due to the above described geometric contours, the circumferences of the pistons 1 and 2 are divided into uniform arches 14 by a number divisible by two of axis-near zones or lobes 13. Each second arch 14 is provided with inlet control openings 15 and outlet control openings 16 which through conduits 17 and 18 in pistons 1 and 2 communicate with inlet openings 19 and outlet openings 20 provided in the end faces 21, 22 and 23, 24 respectively. The outlet openings 20 are thus located in the end faces 23 and 24 which face each other.

The lateral parts 7 and 8 are united to form a structural part and form a collecting chamber 25 which is sealed relative to the eccentric 3 by a sleeve 26 which interconnects the pistons 1 and 2. This sleeve must be so strong that it will be able to convey the torque of the two pistons 1 and 2. In the illustrated embodiment, the sleeve 26 is equipped with a cooling chamber 27.

The collecting chamber 25 is through annular gaps 28 provided between the sleeve 26 and the lateral parts 7 and 8 in continuous communication with outlet openings 20 the path curves of which are surrounded by inner axial seals 29.

Inserted into the collecting chamber 25 is a fission carburetor 3 which is common to both pistons 1 and 2 and is fixed to the housing. This carburetor communicates through two conduit systems 31 and 32 with the working chambers 33. The working chambers 33 are formed by the circumferential surface of the pistons, the inner mantle surfaces and the corresponding regions of the lateral parts and are sealed relative to each other by radial sealing strips 34 arranged on the mantles 10 and 11 and by axial seals 29 and 34 provided in the lateral parts 6,7,8,9.

The conduit systems 31 and 32 primarily consist of annular conduit means 37,38 from which branches 39 and 40 lead to openings or mouths 41 and 42 in the lateral parts 7 and 8. When the pistons 1 and 2 rotate in the direction indicated by arrow 43, the openings 41 and 42 are passed over by change-over passages 45 pertaining to mouth openings 44. These passages or conduits 45 are located in the end face 23 of the pistons 1 and 2. The path 46 of the openings 44 is shown in FIG. 3 by a dotted line. FIG. 3 also shows that the mouth openings 41 and 42 are located ahead of the upper dead center point. Instead of the illustrated embodiment in which only one change-over passage 45 is provided for each circumferential piston range 14 without inlet and outlet opening and in which the mouth openings 41 and 42 are located on the path 46, it is also possible for purposes of avoiding a flow reversal to provide two change-over passages in the change-over conduit 45. The mouth openings in the end face of said change-over passages are either in different end faces of the piston or describe radially offset paths or grooves on which corresponding mouth openings are located in the lateral parts of the housing.

The mouth openings 41 and 42 are surrounded by annular axial seals 35 which through sealing bolts 47 border the inner axial seal 29 and the radial sealing strips 34.

The operation of the rotary piston internal combustion engine according to the present invention is as follows: During the increase in volume of the corresponding working chambers 33, fresh air is drawn in through intake conduits 48 and 49 on the lateral parts 6 and 9 respectively through feeding passages 50, 51 inlet openings 19, inlet passages 17 and inlet control openings 15. When the control opening 15 passes over the respective sealing strip 34 which in the direction of rotation of the piston is the nearest sealing strip, the intake cycle is completed. During the further rotation of the piston, fresh air is compressed in the working chamber 33. When the change-over passage 45 passes with its mouth opening at the end face over the mouth opening 41, the mouth opening 52 on the circumference of the piston establishes communication between the fission carburetor 30 and the working chamber 33. Due to a higher pressure level in the fission carburetor, fission gas passes into the working chamber 33 where it is during the further rotation of the piston compressed with fresh air. Due to the form and position of the mouth opening 41, the intake of fission gas can be adjusted in conformity with the requirements of the engine.

During the further rotation of the piston, the mouth opening 44 passes over the mouth opening 42. In this connection, the fission carburetor again communicates with the working chamber 33. Due to the compression occurring in the time therebetween, a pressure drop exists from working chamber 33 to the fission carburetor 30 so that a portion of the compressed fission gas-air mixture will be withdrawn from the working chamber and will be conveyed to the fission carburetor 30.

Shortly prior to the upper dead center point, the fission gas-air mixture remaining in the working chamber 33 is ignited and performs work during the subsequent expansion.

According to a further development of the invention, the mouth opening 44 will on its path during the expansion cycle pass over a mouth opening 36 of a further conduit system including a conduit 53 which connects the fission carburetor 30 during an existing pressure drop from the working chamber to the fission carburetor. In this connection, a portion of the exhaust gas is returned to the fission carburetor.

The arrangement of the fission carburetor 30 in that intermediate housing section between the pistons 1 and 2 which intermediate housing section is formed by the lateral parts 7 and 8, brings about the advantage that due to short connecting lines heat and flow losses will be avoided. Furthermore, the transfer of heat from the exhaust gas to the fission carburetor acts in a favorable manner upon the usually endo-thermic reaction during the formation of the fission gas.

It is, of course, to be understood that the present invention is, by no means, limited to the specific showing in the drawings but also comprises any modification within the scope of the appended claims.

What I claim is:

1. A rotary piston internal combustion engine which includes housing means having its inner surface area provided with a plurality of arched surfaces, each two adjacent arched surfaces meeting each other at an inwardly directed area forming a lobe, sealing strip means respectively arranged in and protruding inwardly from said lobes, rotary piston means of the trochoidal construction type arranged within and rotatable relative to said inner surface area for meshing with said arched surfaces, the outer circumference of said piston means being in conformity with the respective number of cycles of the working method employed, the circumference being divided by a plurality of axis near zones into arches forming working chambers with said arched surfaces of said housing means and means within the region of each arch which during compression and expansion cycle forms a portion of the confinement of a working chamber including change-over conduit means, said piston means having one end face thereof provided with a control opening for controlling said change-over conduit means, fission gas carburetor means arranged in said housing means, conduit systems having mouth openings and communicating with said fission gas carburetor means, said change-over conduit means being operable in response to a rotation of said piston means relative to said housing means so to overlap said mouth openings that the working chamber during the first and second portion of said compression cycle temporarily communicates through said change-over conduit means with said fission carburetor so that during said first portion of said compression cycle fission gas is withdrawn from said fission carburetor and during said second phase of said compression stroke a fission gas-air mixture is conveyed to said fission carburetor.

2. An engine according to claim 1, which includes additional conduit means for temporarily during the expansion cycle interconnecting said working chamber and said carburetor.

3. An engine according to claim 1, in which said piston means includes substantially sustantially identical pistons mounted on a common eccentric shaft, said carburetor being located in a section of said housing means between said two pistons.

* * * * *